Figure 1:
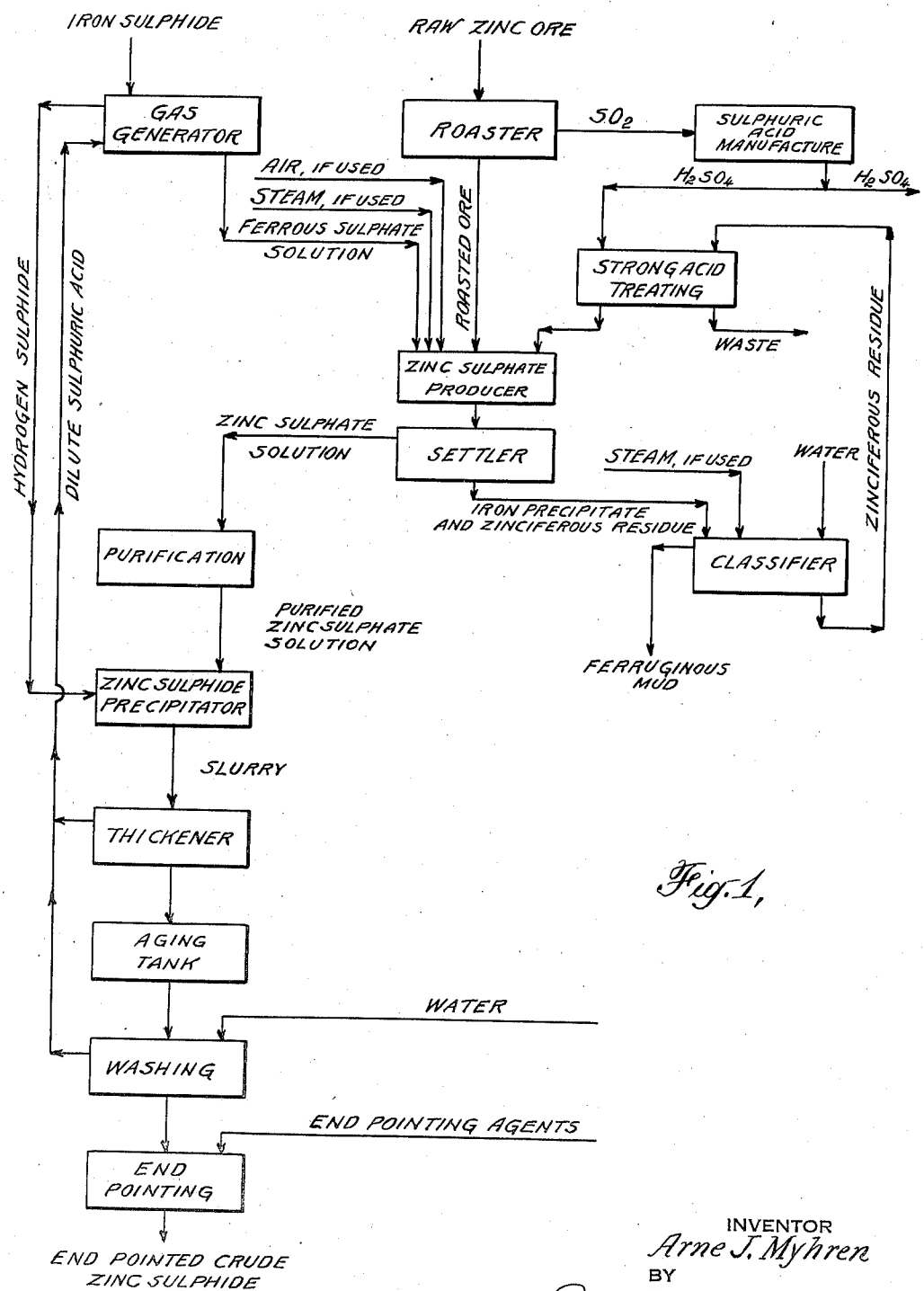

May 10, 1938.  A. J. MYHREN  2,117,205
ZINC SULPHIDE
Filed April 6, 1935  2 Sheets-Sheet 1

INVENTOR
Arne J. Myhren
BY
ATTORNEYS

May 10, 1938.  A. J. MYHREN  2,117,205
ZINC SULPHIDE
Filed April 6, 1935  2 Sheets-Sheet 2
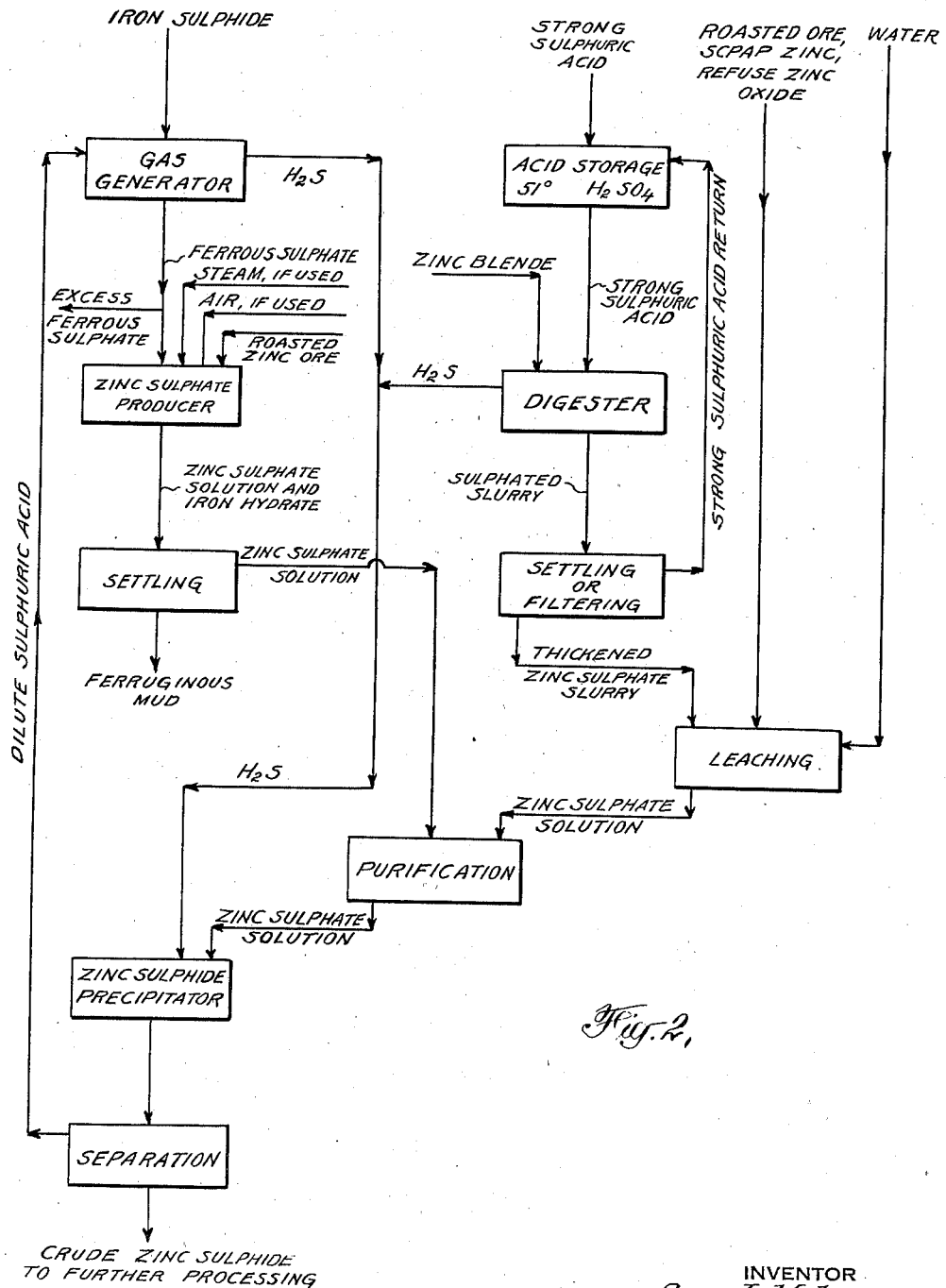

Patented May 10, 1938

2,117,205

UNITED STATES PATENT OFFICE 2,117,205

ZINC SULPHIDE

Arne J. Myhren, Palmerton, Pa., assignor to The New Jersey Zinc Company, New York, N. Y., a corporation of New Jersey Application April 6, 1935, Serial No. 14,991

6 Claims. (Cl. 23—135)

This invention relates to the manufacture of zinc sulphide pigment by the reaction between hydrogen sulphide and an aqueous zinc sulphate solution with resultant formation of a dilute solution of sulphuric acid, and has for its objects the provision of an improved method of utilizing the dilute sulphuric acid thus produced and the provision of an improved method of producing zinc sulphate solution for use in the aforementioned reaction.

Hydrogen sulphide reacts with a dilute aqueous solution of zinc sulphate to form a precipitate of zinc sulphide and a dilute sulphuric acid solution as indicated by the following equation:

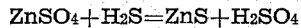

$$ZnSO_4 + H_2S = ZnS + H_2SO_4$$

The present invention contemplates the utilization of the dilute sulphuric acid resulting from the foregoing reaction for the production of hydrogen sulphide. Thus in accordance with the present invention, hydrogen sulphide gas for the foregoing reaction is produced by the reaction of the dilute sulphuric acid solution with iron sulphide, viz:

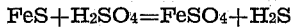

$$FeS + H_2SO_4 = FeSO_4 + H_2S$$

A dilute solution of ferrous sulphate is thus formed.

The invention further contemplates utilization of the ferrous sulphate solution produced in the reaction between iron sulphide and the dilute sulphuric acid. The ferrous sulphate solution may be employed to dissolve zinc from zinciferous material with the resultant formation of zinc sulphate solution and a precipitate comprising iron hydrate. The precipitate is separated from the solution, and the zinc sulphate solution thus obtained is converted into zinc sulphide by reaction with hydrogen sulphide.

The invention is particularly adapted for use in connection with the processes of precipitating zinc sulphide by the reaction of hydrogen sulphide with zinc sulphate solution disclosed in the copending applications for Letters Patent of the United States, Serial No. 702,578 and Serial No. 702,580, filed December 15, 1933, of Arne J. Myhren and Byron Marquis. These applications eventuated into United States Patents 2,020,325 and 2,020,902, respectively, on November 12, 1935. The apparatus disclosed in the copending application for Letters Patent of the United States Serial No. 702,579, filed December 15, 1933, of Arne J. Myhren and Byron Marquis, (now United States Patent 2,020,850 of November 12, 1935) may also be used in the step of precipitating zinc sulphide by the reaction of hydrogen sulphide and zinc sulphate solution in combination with the present method. In certain of its embodiments the invention may be utilized in conjunction with the invention of the copending application for Letters Patent of the United States Serial No. 538,611 of Leon S. Holstein and George F. A. Stutz, filed May 19, 1931 (now United States Patent 2,020,313 of November 12, 1935).

The invention will be better understood from the following description taken in conjunction with the accompanying drawings, in which Fig. 1 is a diagrammatic flowsheet of a zinc sulphide precipitating plant embodying the invention; and Fig. 2 is a diagrammatic flowsheet showing a modified practice of the invention for producing hydrogen sulphide for use in a zinc sulphide plant.

Referring to Fig. 1 of the drawings, the zinc sulphide precipitation is conducted in an enclosed tank or series of tanks into which dilute zinc sulphate solution and hydrogen sulphide are introduced. The precipitation may be performed advantageously in a series of tanks equipped with cooperating Venturi eductors as described in the aforementioned patent application Serial No. 702,579. A slurry of zinc sulphide precipitate and dilute sulphuric acid is discharged from the precipitating apparatus into a thickener from which dilute sulphuric acid overflows, the thickened zinc sulphide precipitate being withdrawn from the bottom of the thickener.

The thickened zinc sulphide precipitate is transferred to an aging tank, and thence to a washing system where it is washed in countercurrent with water to remove the sulphuric acid still present. The sulphuric acid thus removed may be combined with the somewhat more concentrated sulphuric acid solution overflowing from the aforementioned thickener. From the washing system the slurry of zinc sulphide is transferred to end-pointing tanks, where it is treated with appropriate neutralizing agents, such as calcium hydroxide and sodium hydroxide, to remove the acid present, and likewise with appropriate agents, such as zinc oxide, to prepare it for the subsequent calcining treatment. After end-pointing, the crude slurry of zinc sulphide is subjected to regular processing operations for pigment production, such, for example, as filter pressing, drying, calcination, quenching in water, wet grinding, filter pressing, drying and disintegration.

The dilute sulphuric acid overflowing from the thickener, with or without the more dilute sulphuric acid recovered in the washing system, is sent to a gas generator wherein it reacts with iron sulphide to form hydrogen sulphide gas and a ferrous sulphate solution. The hydrogen sulphide thus generated is sent to the zinc sulphide precipitator. The ferrous sulphate solution may be wasted, or more advantageously, it may be employed as a reagent for the production of zinc sulphate as follows:

Ferrous sulphate solution reacts with zinc oxide according to the following equation:

$$FeSO_4 + ZnO + H_2O = ZnSO_4 + Fe(OH)_2$$

The ferrous hydroxide thus formed is a slimy precipitate.

In the presence of an oxidizing agent, for example air, ferrous sulphate solution reacts with zinc oxide to form ferric hydroxide precipitate according to the following equation:

$$2FeSO_4 + 2ZnO + 3H_2O + O = 2ZnSO_4 + 2Fe(OH)_3$$

The ferric hydroxide precipitate is more flocculent than the ferrous hydroxide; it settles and filters more easily; and is therefore more easily separated from the zinc sulphate solution.

Roasted zinc ore, scrap zinc, or refuse zinc oxide may be used as source materials and reacted with ferrous sulphate solutions according to the above equations, with a resultant production of zinc sulphate solution and a precipitate of iron hydroxide.

In the process as illustrated by Fig. 1, the ferrous sulphate solution is sent to a zinc sulphate producer, such as a Pachuca tank, to which roasted zinc ore and air are supplied. Refuse zinc oxide, or scrap zinc, may be substituted for the roasted zinc ore. In the ensuing reaction, zinc sulphate solution and a precipitate of ferric hydroxide are formed. In order to prevent the formation of basic ferric sulphates, or to break up such sulphates should they be formed, the mixture may be heated. This may be done conveniently by injecting steam directly into the mixture in the zinc sulphate producer or into the residue after the zinc sulphate solution has been removed.

The ferric hydroxide, together with any residual roasted ore are separated from the zinc sulphate solution by settling, clarification, thickening, or kindred methods for the separation of solids and liquids. The ferric hydroxide is removed as a slurry and the zinc sulphate solution is transferred to the zinc sulphide precipitator.

In the event that aeration, or other oxidizing treatment is omitted, the iron precipitate will consist largely of ferrous hydroxide. This precipitate may also be separated from the zinc sulphate solution and any residual zinciferous solid material.

Unless the zinc sulphate solution produced in the zinc sulphate producer is substantially free from contaminants deleterious in zinc sulphide pigments, it must be purified prior to being used in the zinc sulphide precipitator. This purification may be advantageously effected by the method described in the aforementioned copending application Serial No. 538,611, filed May 19, 1931.

In order to assure a complete consumption of the ferrous sulphate, with a consequent recovery of its sulphate content, it is advantageous to supply an excess of roasted zinc ore, refuse zinc oxide, scrap zinc or other suitable zinciferous material to the aeration step of the process. In this event the iron hydroxide slurry resulting from the separating operation will contain a zinciferous residue. If the reaction has been conducted without the application of sufficient heat, the slurry may also contain insoluble basic ferric sulphates, materials in which ferric sulphate and ferric hydroxide are united in various proportions as indicated in the following formula in which X and Y represent the respective proportions of ferric sulphate and ferric hydroxide, i. e.

$$X[Fe_2(SO_4)_3] \cdot Y[Fe(OH)_3]$$

If the operation is so conducted as to produce a slurry containing iron hydroxide precipitates plus residual zinciferous material, the iron precipitates may be removed by classification. Any of the customary types of classifiers may be used. The ferruginous mud discharged from the classifier is wasted. Because iron hydroxides are insoluble in water, they may be impounded readily and therefore present no problem of stream pollution, as would be the case if a soluble iron salt were discharged.

When the amount of combined sulphate in the ferruginous precipitate warrants recovery, the precipitate is heated either during classification or thereafter, with resultant decomposition of basic ferric sulphates and formation of a dilute solution of sulphuric acid, which may be utilized to dissolve zinciferous materials or for other purposes.

The cleaned zinciferous residue produced at the classifier is treated with sulphuric acid to dissolve the remaining zinc content as zinc sulphate. When the residue contains zinc ferrite, as is likely when it is produced from a roasted zinc ore, concentrated sulphuric acid is employed as a solvent. When zinc ferrites are dissolved, the resulting zinc sulphate solution contains iron and the solution is sent to the zinc sulphate producer in order that the iron may be precipitated. If the solution contains no iron it may be sent to the zinc sulphide precipitator after treatment to remove other deleterious contaminants in the purification apparatus.

As shown in Fig. 1, the sulphuric acid used to treat the zinciferous residue from the classifier may be conveniently manufactured from the sulphur dioxide produced during the roasting of the zinc ore, prior to its introduction into the aeration apparatus.

It will be apparent that iron sulphate solutions derived from sources other than the reaction between sulphuric acid and iron sulphide may be employed to dissolve zinc from the zinc oxide or other zinciferous materials.

As illustrated in Fig. 2, the method of the invention is particularly applicable to the utilization of the dilute sulphuric acid produced in the cyclic process for producing zinc sulphide pigment from zinc sulphide ores as described in the aforementioned copending application Serial No. 538,611. This copending application describes a method of producing zinc sulphate solution and hydrogen sulphide by bringing raw zinc blende ore or concentrates into reaction with concentrated sulphuric acid, and then producing zinc sulphide by causing the hydrogen sulphide thus formed to react with a dilute zinc sulphate solution formed from the slurry of crystalline zinc sulphate produced in the digestion or hydrogen sulphide generating step. In the practical operation of the process described in application Serial No. 538,611, zinc sulphate is obtained in excess of that equivalent to the hydrogen sulphide produced for the following two reasons:

(1) Some of the hydrogen sulphide resulting from the reaction $ZnS+H_2SO_4=ZnSO_4+H_2S$ reacts with the excess sulphuric acid present to form elemental sulphur. In consequence there is a loss of hydrogen sulphide on account of this secondary reaction.

(2) Excess sulphuric acid must be used to insure adequate recovery of zinc sulphate in the treatment of zinc blende with sulphuric acid. In consequence, the zinc sulphate solution prepared by leaching the product of this reaction with water contains substantial proportions of sulphuric acid. It is advantageous to neutralize this sulphuric acid with material containing zinc oxide, such as roasted blende. This neutralization operation yields a further amount of zinc sulphate, in addition to the amount equivalent to hydrogen sulphide obtained in the treatment of the raw zinc blende with sulphuric acid.

The present method permits the use of the dilute sulphuric acid obtained in the precipitation of zinc sulphide by the reaction of hydrogen sulphide with zinc sulphate to produce sufficient hydrogen sulphide to transform the excess zinc sulphate originating from the two sources described above into zinc sulphide. Under such circumstances, because there is already an excess of zinc sulphate in the process, it will usually be undesirable to utilize all of the ferrous sulphate liquor for the production of additional zinc sulphate solution.

When the invention is utilized merely for the purpose of supplying hydrogen sulphide to combine with excess zinc sulphate originating from the aforementioned sources, and when therefore the sulphate obtained in the reaction of the dilute sulphuric acid with sulphide is not to be used to produce zinc sulphate solution, waste or by-product sulphides such as calcium sulphide or sodium sulphide can be substituted wholly or in part for iron sulphide.

Referring to Fig. 2, it will be seen that the dilute sulphuric acid produced in the zinc sulphide precipitator is separated from the precipitate and combined with iron sulphide to yield hydrogen sulphide and a solution containing ferrous sulphate. The hydrogen sulphide thus formed, together with that produced in the digester from the reaction between zinc blende and concentrated sulphuric acid, is sent to the zinc sulphide precipitator.

The ferrous sulphate may be discarded, or in the event that its sulphate content can be utilized without disturbing the sulphate balance in the process, it may be combined with zinciferous material to produce zinc sulphate solution. This zinc sulphate solution together with that produced by leaching the crystalline slurry of zinc sulphate originating in the digester from zinc blende, is purified and sent to the zinc sulphide precipitator.

The zinc sulphide precipitate is, of course, processed in the regular manner as hereinbefore set forth.

The iron sulphide used in the practice of the invention may be in the form of a matte containing for example copper sulphide and zinc sulphide, obtained by the partial roasting of cupriferous and zinciferous pyrites under such conditions that the second sulphur atom present in the pyrites ($FeS_2$) is expelled with resultant formation of matte. The treatment of this matte with dilute sulphuric acid to produce hydrogen sulphide gas and ferrous sulphate solution will yield a residue containing copper and zinc in concentrated form, from which residue both these metals may be readily recovered. When the step of producing zinc sulphate solution by treating roasted ore with ferrous sulphate solution is utilized, the invention permits of the production of zinc sulphide pigments with roasted zinc ore and iron sulphide as raw material. The iron sulphide required may be obtained by any conventional method such as the reaction of iron with pyrites or the roasting of pyrites under such conditions that it is transformed from $FeS_2$ to $FeS$.

I claim:—

1. In a process involving the production of zinc sulphide by a reaction between hydrogen sulphide and an aqueous solution of zinc sulphate with the formation of dilute sulphuric acid and the separation of the dilute sulphuric acid from the zinc sulphide precipitate, the improvement which comprises producing hydrogen sulphide for said reaction by the reaction of the dilute sulphuric acid with iron sulphide with resultant formation of an iron sulphate solution, reacting the iron sulphate solution with zinc oxide bearing material to form said zinc sulphate solution and reacting the hydrogen sulphide with said zinc sulphate solution to produce zinc sulphide and dilute sulphuric acid.

2. In a process involving the production of a zinc sulphide precipitate by a reaction between zinc sulphate solution and hydrogen sulphide with resultant formation of a sulphuric acid solution, the improvement which comprises withdrawing the sulphuric acid solution, adding iron sulphide to the sulphuric acid solution to produce hydrogen sulphide and ferrous sulphate solution, aerating the ferrous sulphate solution in the presence of a solid zinc oxide bearing material to form zinc sulphate solution and ferric hydroxide precipitate, separating the zinc sulphate solution thus formed from the ferric hydroxide precipitate, and combining the zinc sulphate solution thus formed with the hydrogen sulphide resulting from the reaction between the iron sulphide and the sulphuric acid solution.

3. In a process involving the precipitation of zinc sulphide from an aqueous solution of zinc sulphate, the improvement which comprises reacting iron sulphide with sulphuric acid to form hydrogen sulphide and an aqueous solution of ferrous sulphate, reacting the aqueous solution of ferrous sulphate with an excess of solid zinc oxide bearing material to form zinc sulphate solution, an iron hydrate precipitate and a solid zinciferous residue, separating the zinc sulphate solution, the iron hydrate precipitate and the zinciferous residue from each other, and reacting the zinc sulphate solution with the hydrogen sulphide to form zinc sulphide.

4. In a process involving the production of a zinc sulphide precipitate from an aqueous solution of zinc sulphate, the improvement which comprises reacting iron sulphide with a sulphuric acid solution to form hydrogen sulphide and an aqueous solution of ferrous sulphate, reacting the aqueous solution of ferrous sulphate with an excess of a roasted zinc ore to form zinc sulphate solution, an iron hydrate precipitate and a solid zinciferous residue, separating the zinc sulphate solution, the iron hydrate precipitate and the zinciferous residue from each other, adding concentrated sulphuric acid to the zinciferous residue to dissolve zinc ferrites and form additional zinc sulphate and reacting the zinc sulphate with the hydrogen sulphide to produce zinc sulphide.

5. In a process involving the production of zinc sulphide precipitate by reacting hydrogen sulphide and zinc sulphate solution to form a dilute sulphuric acid, the steps which comprise reacting the dilute sulphuric acid with iron sulphide to form a ferrous sulphate solution and hydrogen sulphide, utilizing the hydrogen sulphide to precipitate zinc sulphide from the zinc sulphate solution, roasting zinc blende to form sulphur dioxide, converting the sulphur dioxide into concentrated sulphuric acid, reacting the ferrous sulphate solution with an excess of the roasted zinc ore to form zinc sulphate, iron hydrate precipitate and a zinciferous solid residue, treating the zinciferous residue with the sulphuric acid to produce additional zinc sulphate, and precipitating zinc sulphide by adding the hydrogen sulphide to the zinc sulphate solutions produced by treating the roasted zinc ore with the ferrous sulphate solution and by treating the zinciferous residue with the sulphuric acid.

6. A process for the production of zinc sulphide precipitate which comprises reacting a sulphuric acid solution with iron sulphide to produce hydrogen sulphide and ferrous sulphate solution, reacting the ferrous sulphate solution with zinc oxide to produce zinc sulphate solution and a ferruginous precipitate, and reacting the zinc sulphate solution with the hydrogen sulphide to produce a zinc sulphide precipitate.

ARNE J. MYHREN.